Nov. 29, 1960 W. A. BAUM 2,962,649
CONSTANT D.C. VOLTAGE CIRCUIT
Filed Sept. 20, 1954
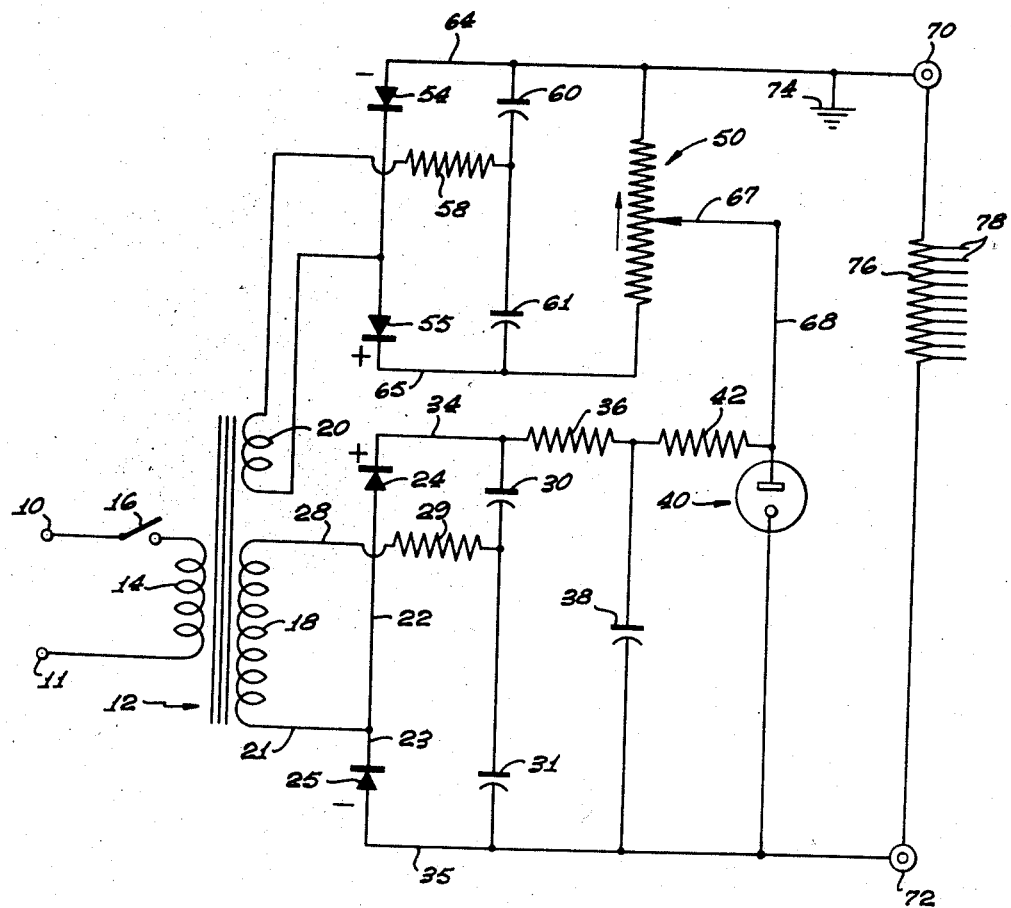
WILLIAM A. BAUM,
INVENTOR.
BY
ATTORNEY.

United States Patent Office 2,962,649
Patented Nov. 29, 1960

2,962,649
CONSTANT D.C. VOLTAGE CIRCUIT

William A. Baum, Pasadena, Calif., assignor to Photo Research Corporation, Burbank, Calif., a corporation of California Filed Sept. 20, 1954, Ser. No. 457,152

4 Claims. (Cl. 321—16)

This invention relates generally to an electronic rectifying circuit and particularly to such a circuit for producing a D.C. output voltage whose value remains virtually constant despite voltage fluctuations of the A.C. power input.

The invention consists generally in electrically producing a plurality of D.C. component voltages from an A.C. power source and combining such voltages to obtain a D.C. output voltage. The several D.C. component voltages bear such relation to one another and are so combined that the D.C. output voltage assumes a constant value regardless of voltage changes of the A.C. power input. Thus, each of the component D.C. voltages exhibits certain changes as a result of input A.C. voltage fluctuations, and these changes are caused to be cancelled out when the components are combined in polarity opposition.

In the preferred form of the invention herein shown and described, two component D.C. voltages are derived from an A.C. power source. The larger component has a value somewhat greater than the eventual output voltage desired, and is produced by conventional rectifying and filter means. Voltage doubling circuitry may be included, and the component voltage thus produced is roughly regulated by a voltage regulator tube such as, illustratively, a Victoreen 5841 Corona regulator tube. As is well known, the output voltage of such a circuit is only partially regulated, some residual dependence upon A.C. input voltage remaining.

The second D.C. component voltage, of relatively small magnitude, is derived from the same or a related A.C. power source, preferably by conventional rectifying and filter means which may include voltage doubling means also. This second, or smaller, D.C. component voltage is completely dependent in value upon the magnitude of the input A.C. voltage. Now, by properly selecting a portion of the second D.C. component voltage and combining such portion with the partially regulated first D.C. component voltage in polarity opposition, it is possible to cause the variations in the smaller D.C. component (caused by A.C. input voltage fluctuations) to cancel out the similarly caused residual variations of the first, or larger D.C. component. Thus, the output D.C. voltage is the algebraic sum of the instantaneous values of the component voltages which sum can be made to be constant regardless of input A.C. voltage fluctuations.

As used herein, the word "regulated" applied to a D.C. voltage, refers to the degree of independence of a rectified D.C. voltage upon fluctuations of A.C. input voltage, and does not refer to the change in D.C. voltage incident to increase or decrease of D.C. power output of the circuit. The present invention finds particular application where the current or power output of the circuit is small, the principal requirement being the provision of constant D.C. potential.

The present circuit has proved especially well adapted for use in connection with photomultiplier tubes. As is well known for a constant light input at the photocathode, the output current at the anode of such a tube varies greatly with variation of D.C. voltage impressed upon the dynodes of the tube. The anode response varies, very roughly, as an exponential power of the applied voltage, where the exponent is of the same order as the number of stages of multiplication.

It will be understood by those skilled in the art that, although the present invention is particularly applicable for use as a D.C. voltage supply for the dynodes of a photomultiplier tube as above mentioned, nevertheless the circuit is not limited to such application and other uses are within the contemplation of the invention. Generally, such uses are those requiring a substantially constant current input at a constant D.C. voltage.

An object of the present invention is, therefore, to disclose a novel rectifying and regulating circuit for producing a D.C. output voltage virtually independent of voltage fluctuations in the A.C. power input.

Another object of the invention is to disclose a rectifying and regulating circuit including two rectifying circuit components and means for combining the output of said components in polarity-opposed or bucking relationship.

A further object is to provide rectifying circuitry for producing a relatively high, partially regulated D.C. voltage and a relatively low non-regulated D.C. voltage and for combining both voltages to produce an output D.C. voltage virtually independent of input A.C. line voltage fluctuations.

Another object of the invention is to disclose circuitry having the above characteristics which is simple and reliable in operation and may be made up of standard electrical circuit elements.

These and other and allied objects and purposes of the invention will be understood from a description of a preferred embodiment thereof taken in connection with the accompanying drawing which shows, illustratively, a circuit diagram for practicing the invention.

Referring now in detail to the drawing, an A.C. source (not shown) is adapted to be connected to the terminals 10 and 11. A transformer indicating generally at 12 includes a primary winding 14 connected through a disconnect switch 16 to the input terminals 10 and 11. Transformer 12 includes high voltage secondary winding 18 and low voltage secondary winding 20.

Voltage doubling and rectifying means are provided and are fed by the output of the high voltage secondary winding 18. One end of this secondary winding is connected through conductors 21, 22 and 23 to a pair of rectifying elements 24 and 25. The other end of secondary winding 18 is connected through conductor 28 and resistor 29 to capacitors 30 and 31. The other plates of these capacitors are connected through lines 34 and 35 respectively to the sides of the rectifiers 24 and 25 distant from the secondary winding 18.

By the circuitry thus far described it will be understood that a D.C. voltage is created between the lines 34 and 35, 34 being of positive polarity relative to 35 as indicated by the polarity signs on the output sides of the rectifiers 24 and 25. Moreover, it will be understood that the voltage thus created is approximately double that produced by the secondary winding 18. It will be also seen that this D.C. voltage is unregulated, that is, any line voltage fluctuations in the A.C. power source connected to terminals 10 and 11 will be reproduced instantaneously and virtually in direct proportion to variations in the D.C. voltage across lines 34 and 35. Means for filtering the rectified D.C. component appearing across lines 34 and 35 are provided, including resistor 36 and capacitor 38.

Means are provided for partially regulating the rectified and filtered D.C. voltage appearing across capacitor 38. In the present illustration, such means are afforded by a regulator tube indicated generally at 40 and a series resistor 42. The regulator tube may, for example, be a Victoreen 5841 Corona regulator, although it will be understood by those skilled in the art that this particular tube is illustrative only of many voltage regulator tubes suitable for the present purpose. Regulator tube 40 and resistor 42 serve to partially regulate or smooth out variations in voltage appearing across capacitor 38 resulting from fluctuations of voltage in the A.C. input circuit. However, the degree of regulation attainable by the use of a regulator tube such as the Victoreen 5841 is not perfect, so that the D.C. voltage component appearing across tube 40 is partially dependent upon the input A.C. voltage impressed on input terminals 10 and 11, and varies in timed relation with input voltage fluctuations.

Means are provided for producing a second D.C. voltage component which is virtually completely dependent upon the magnitude of input A.C. voltage, and which is smaller than the first D.C. voltage component previously described across tube 40. Illustratively, such means are here shown as including a secondary winding 20 of transformer 12, rectifying, filtering and voltage doubling means fed by the output of secondary winding 20 and a voltage divider or potentiometer indicated generally at 50.

Rectifying, filtering and voltage doubling means are fed from the output of secondary winding 20 and include rectifier elements 54 and 55, resistor 58 and capacitors 60 and 61. It will be seen that a voltage is created between lines 64 and 65 of approximately double the value of the output voltage of secondary 20. The polarity of conductor 65 is positive relative to the polarity of conductor 64 as indicated by the polarity signs adjacent the output sides of the rectifier elements 54 and 55. The voltage thus created produces a current flow and consequent voltage drop in potentiometer 50 which is connected across conductors 64 and 65. It will be evident that the voltage appearing across potentiometer 50 is substantially completely unregulated so that fluctuations in the value of the input A.C. voltage applied to terminals 10 and 11 will appear almost exactly as D.C. voltage variations across the potentiometer 50.

Means are provided for combining the D.C. voltage component across tube 40 with a selected portion of the voltage across potentiometer 50. Such means are here shown as including movable contact arm 67 adapted to slidingly contact potentiometer 50, the arm being connected through conductor 68 to the positive side of regulator tube 40. It will be noted that the current flow through potentiometer 50 is upwardly as seen in the drawing as shown by the arrow adjacent the potentiometer. Thus the component of D.C. voltage picked off potentiometer 50 by arm 67 is combined with the D.C. voltage component across regulator tube 40 in polarity opposition, and the combined voltage between conductors 64 and 35 is somewhat less than the D.C. voltage component across the regulator tube 40. This combined voltage is fed to output terminals 70 and 72. One of these terminals, as 70, may be grounded at 74 although it is to be understood that the circuit may instead be grounded at some other point if desired. Any suitable load such as a high resistance voltage divider or resistor 76 may be connected between the output terminals 70 and 72, and, when used in connection with a photomultiplier tube, a number of conductors 78 may be provided and adapted to be connected to the dynodes of such tube (not shown).

I have found that the D.C. voltage components above described, when combined as above set forth, can be made to yield an output D.C. voltage virtually constant despite relatively wide fluctuations in the voltage of the A.C. power supply. It is to be noted that the D.C. voltage component from the upper portion of potentiometer 50 is very much smaller in value than that of the D.C. voltage appearing across the regulator tube 40, and is adjustable so that its voltage variations are sufficient to cancel out the voltage variations of the partially regulated voltage across the regulator tube.

In a typical circuit embodying the present invention, terminals 10 and 11 may be connected to a 115 volt A.C. power source, and the high and low voltage secondary windings 18 and 20 may have voltages of 1600 and 150 respectively. Typical values of the circuit components shown are as follows:

| Component | Unit | Value |
|---|---|---|
| Resistor 29 | megohms | 3.5 |
| Resistor 36 | do | 1 |
| Resistor 42 | do | 1 |
| Potentiometer 50 | do | 0.5 |
| Resistor 58 | do | 0.3 |
| Resistor 76 | do | 10 |
| Capacitors 30, 31 | mfd | .02 |
| Capacitor 38 | mfd | .05 |
| Capacitors 70, 71 | mfd | 0.1 |

It is to be distinctly understood that the preceding values are presented solely by way of illustration and not as limiting the scope of the present invention. Changes and variations from the particular circuit components described, and from their values, may be made without departing from the invention, and such changes and variations are intended to be embraced within the scope of the appended claims.

I claim:

1. A rectifying circuit for producing a D.C. output voltage from an A.C. source comprising: a transformer having a primary winding connectible to an A.C. power source, and high and low voltage secondary windings; rectifier means fed by said high voltage secondary winding for producing a rectified high voltage; means connected across said rectified high voltage for producing a D.C. voltage component varying only slightly with fluctuations in the voltage of said high voltage secondary winding; second rectifier means fed by said low voltage secondary winding for producing a rectified low voltage; and means for combining in series and in polarity opposition said D.C. voltage component and said rectified low voltage to form a D.C. output voltage of virtually constant value despite input A.C. voltage fluctuations.

2. A regulated D.C. voltage supply circuit comprising: a source of alternating current power subject to transient voltage fluctuations; a transformer having a primary winding connected to and energized by said source, a high voltage secondary winding and a low voltage secondary winding; a rectifying and voltage doubling circuit connected to the high voltage secondary winding; means connected across said rectifying circuit for roughly regulating the output voltage thereof and producing a D.C. voltage component; and means for combining in series a compensating, unregulated D.C. voltage derived from said low voltage secondary winding in polarity-opposed relation with said D.C. voltage component to form a D.C. output voltage of virtually constant value despite input A.C. voltage fluctuations.

3. A circuit for producing a constant direct current output from an A.C. source subject to voltage fluctuations comprising: means for producing a relatively large, partially regulated D.C. voltage component from an A.C. source; means for producing a relatively small, unregulated D.C. voltage component from the same A.C. source; and means for combining in series said D.C. voltage components in polarity opposed relation to form a regulated D.C. output voltage of virtually constant value despite input A.C. voltage fluctuations.

4. A regulated D.C. voltage supply circuit comprising: a transformer having a primary winding energizable by an A.C. source and first and second secondary windings, the first said secondary winding providing a higher voltage output than the second; means for rectifying the voltages of said secondary windings; voltage regulator means including a voltage regulator tube and a resistor across the higher rectified voltage; and means for adding in series and in phase opposition the voltage across said tube and a selected portion of the lower rectified voltage to form a D.C. output voltage of virtually constant value despite input A.C. voltage fluctuations.

References Cited in the file of this patent

UNITED STATES PATENTS

| | | |
|---|---|---|
| 1,357,223 | Chubb | Nov. 2, 1920 |
| 1,835,121 | Rentschler | Dec. 8, 1931 |
| 1,967,303 | Grant | July 24, 1934 |
| 2,201,979 | Christie | May 28, 1940 |
| 2,299,942 | Trevor | Oct. 27, 1942 |
| 2,413,033 | Potter | Dec. 24, 1946 |
| 2,431,994 | Dibrell et al. | Dec. 2, 1947 |
| 2,458,516 | Klemperer et al. | Jan. 11, 1949 |
| 2,474,255 | Kelly | June 28, 1949 |
| 2,763,828 | Jensen | Sept. 18, 1956 |